United States Patent
Takahashi

(10) Patent No.: US 11,104,211 B2
(45) Date of Patent: Aug. 31, 2021

(54) SLIDER-EQUIPPED WINDOW GLASS AND PROCESS FOR ITS PRODUCTION

(71) Applicant: AGC INC., Tokyo (JP)

(72) Inventor: Kazuhiro Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 196 days.

(21) Appl. No.: 16/201,302

(22) Filed: Nov. 27, 2018

(65) Prior Publication Data

US 2019/0176579 A1 Jun. 13, 2019

(30) Foreign Application Priority Data

Dec. 8, 2017 (JP) .............................. JP2017-236134

(51) Int. Cl.
| | |
|---|---|
| *E05D 15/16* | (2006.01) |
| *B60J 1/17* | (2006.01) |
| *B60J 5/04* | (2006.01) |
| *B60J 1/00* | (2006.01) |

(52) U.S. Cl.
CPC ............... *B60J 1/17* (2013.01); *B60J 5/0402* (2013.01); *E05D 15/165* (2013.01); *B60J 1/001* (2013.01); *B60J 1/004* (2013.01); *E05Y 2900/55* (2013.01)

(58) Field of Classification Search
CPC .. B60J 1/17; B60J 1/004; B60J 5/0402; E05D 15/165; E05Y 2900/55
USPC .................................................... 49/440, 441
See application file for complete search history.

(56) References Cited

U.S. PATENT DOCUMENTS

| | | | | | |
|---|---|---|---|---|---|
| 4,483,100 | A | * | 11/1984 | Blankenburg | ........ E05F 11/426 49/352 |
| 4,490,942 | A | * | 1/1985 | Arnheim | ................... B60J 10/24 49/374 |
| 4,874,201 | A | * | 10/1989 | Scaglietti | ................. B60J 10/24 296/201 |
| 4,875,307 | A | * | 10/1989 | Barbero | ................... B60J 10/24 49/374 |
| 4,969,293 | A | * | 11/1990 | Guillon | ..................... B60J 10/74 49/441 |
| 4,970,828 | A | * | 11/1990 | Mesnel | ..................... B60J 10/32 493/74 |
| 5,086,589 | A | * | 2/1992 | dibenedetto | ........... B60J 5/0402 296/146.3 |
| 5,613,325 | A | * | 3/1997 | Mariel | ............. B32B 17/10036 49/374 |

(Continued)

FOREIGN PATENT DOCUMENTS

| | | |
|---|---|---|
| EP | 1 464 524 A2 | 10/2004 |
| JP | 2008-001227 A | 1/2008 |
| JP | 2017-094921 A | 6/2017 |

*Primary Examiner* — Jerry E Redman
(74) *Attorney, Agent, or Firm* — Foley & Lardner LLP

(57) ABSTRACT

To provide a slider-equipped window glass capable of increasing the productivity and quality, and a process for its production. A slider 24 is an integrally molded product comprising an inner layer portion 36 and an outer layer portion 38. The inner layer portion 36 is bonded to a vehicle inner surface 20F of a window glass 20, and the outer layer portion 38 is located on the vehicle inner surface side of the inner layer portion 36 and is made of a material harder than the inner layer portion 36. Further, in the outer layer portion 38, a concave engaging portion 26 to engage with an up-and-down movement guide member 22, is formed.

7 Claims, 7 Drawing Sheets

(56) References Cited

U.S. PATENT DOCUMENTS

| | | | | |
|---|---|---|---|---|
| 6,976,727 | B2* | 12/2005 | Omori | B60J 1/16 |
| | | | | 296/146.16 |
| 8,434,267 | B2* | 5/2013 | Bocutto | B60J 10/70 |
| | | | | 49/479.1 |
| 8,561,354 | B2* | 10/2013 | Grudzinski | B60J 10/79 |
| | | | | 49/502 |
| 8,646,215 | B2* | 2/2014 | Grudzinski | B60J 10/79 |
| | | | | 49/502 |
| 10,167,659 | B2* | 1/2019 | Sagisaka | B60J 1/17 |
| 10,479,173 | B2* | 11/2019 | Krause | B60J 5/0402 |
| 2005/0193633 | A1* | 9/2005 | Scheer | E05D 5/0246 |
| | | | | 49/398 |
| 2005/0229496 | A1* | 10/2005 | Tashima | B60J 10/70 |
| | | | | 49/441 |
| 2006/0021282 | A1* | 2/2006 | Tamaoki | B60J 10/74 |
| | | | | 49/441 |
| 2006/0225361 | A1* | 10/2006 | Scheer | E05D 11/04 |
| | | | | 49/397 |
| 2008/0224501 | A1* | 9/2008 | Zimmer | B60J 1/08 |
| | | | | 296/201 |
| 2009/0309391 | A1* | 12/2009 | Krause | B60J 10/79 |
| | | | | 296/201 |
| 2011/0204671 | A1* | 8/2011 | Baratin | B60J 10/76 |
| | | | | 296/93 |
| 2012/0025564 | A1* | 2/2012 | Ellis | B60J 10/84 |
| | | | | 296/146.9 |
| 2017/0129318 | A1* | 5/2017 | Uemura | B60J 5/0402 |
| 2017/0191085 | A1* | 7/2017 | Pharkya | C12P 3/00 |
| 2018/0319260 | A1* | 11/2018 | Krause | B60J 10/265 |
| 2018/0319261 | A1* | 11/2018 | Krause | B60J 1/17 |
| 2021/0024750 | A1* | 1/2021 | Gradelet | C08L 83/04 |

* cited by examiner

Fig. 1
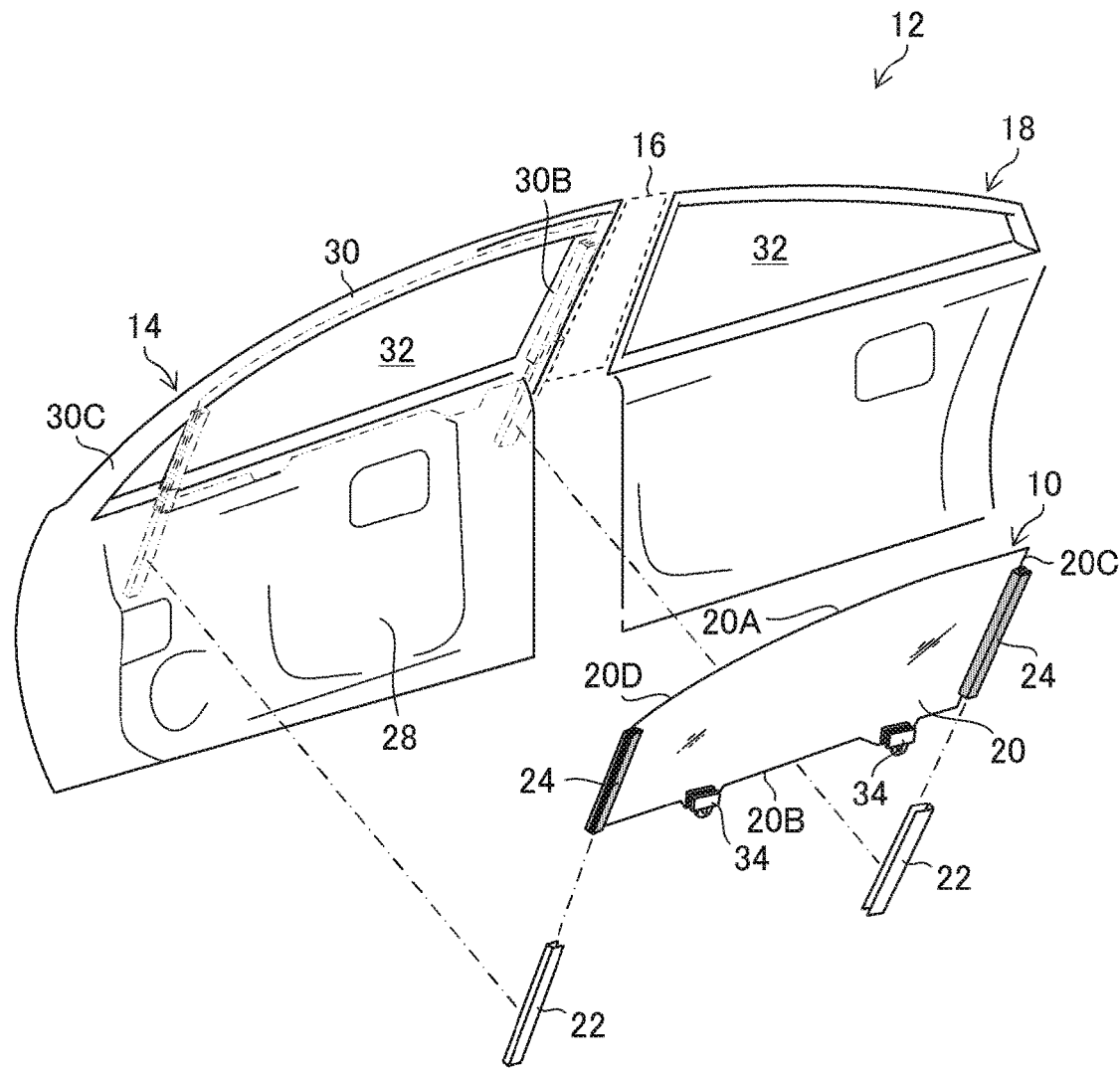
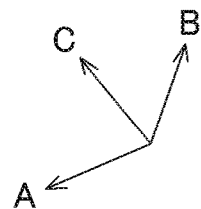

Fig. 3
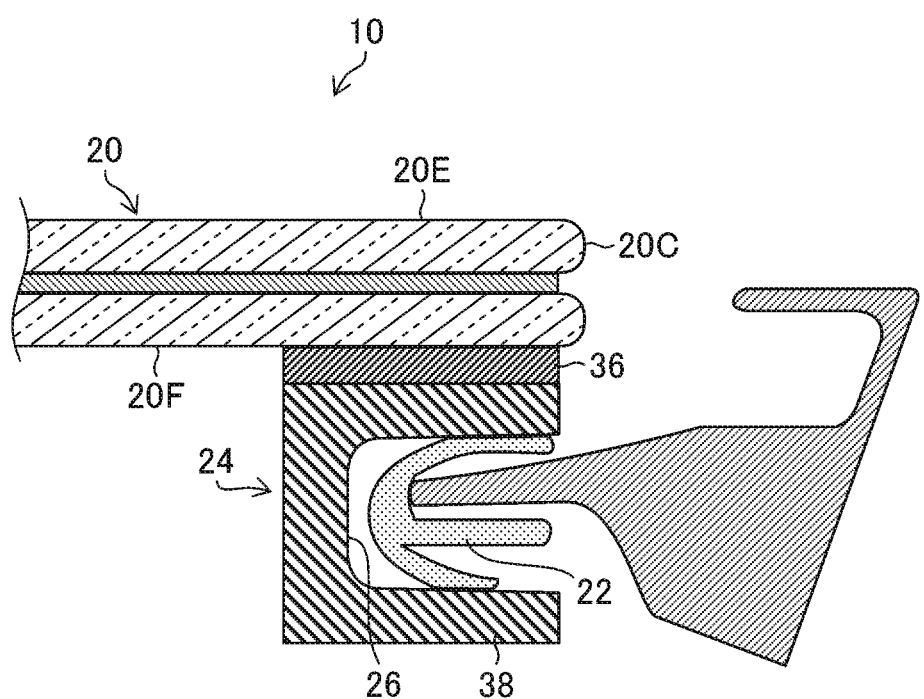
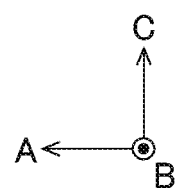

SLIDER-EQUIPPED WINDOW GLASS AND PROCESS FOR ITS PRODUCTION

TECHNICAL FIELD

The present invention relates to a slider-equipped window glass and a process for its production.

BACKGROUND ART

A window glass mounted on a side door of a vehicle to be vertically movable up and down, is connected to a lifting and lowering device (referred to also as a "regulator") disposed inside of the side door and will be moved up and down by a driving force transmitted from the lifting and lowering device.

Patent Document 1 discloses a slider-equipped window glass suitable for a construction wherein the vehicle outer surface of the vehicle main body and the vehicle outer surface of the window glass are flush with each other (referred to also as a flush surfaced construction). This slider-equipped window glass has a first guide member (slider) attached on its side at the vehicle rear side and at the same time, has a second guide member (slider) attached on its side at the vehicle front side, and the first guide member is fitted to a first rail member (up-and-down movement guide member) to be movable up and down, and the second guide member is fitted to a second rail member (up-and-down movement guide member) to be movable up and down.

On the other hand, a slider-equipped window glass disclosed in Patent Document 2 has a slider having a sliding groove, and in this sliding groove of the slider, an up-and-down movement guide piece (up-and-down movement guide member) provided on a side door is inserted. The slider-equipped window glass in Patent Document 2 is moved up and down along the up-and-down movement guide piece at the time of lifting and lowering of the window glass.

PRIOR ART DOCUMENTS

Patent Documents

Patent Document 1: JP-A-2008-1227
Patent Document 2: JP-A-2017-94921

DISCLOSURE OF INVENTION

Technical Problem

However, the slider-equipped window glasses and the processes for their production disclosed in Patent Documents 1 and 2 had the following problems and concerns.

Although not clearly disclosed in Patent Document 1, in the case of attaching a slider to a window glass, such attachment is made by using a double sided adhesive tape or an adhesive as disclosed in Patent Document 2. In a case where an adhesive was used, there was a problem that the productivity of the slider-equipped window glass tended to be poor, since an aging time to cure the adhesive was required in addition to a time to attach the slider to the window glass. Further, even in a case where a double sided adhesive tape was used other than an adhesive, it was very difficult to attach the slider to the window glass with a high precision (e.g. in a few hundred micron order). The attachment position of the slider to the window glass is required to have a high precision in the positional relationship to the up-and-down movement guide member. Therefore, there was a concern that in a case where a double sided adhesive tape or an adhesive was used, such use would present an influence to the quality of the slider-equipped window glass.

The present invention has been made under these circumstances and has an object to provide a slider-equipped window glass capable of increasing the productivity and quality, and a process for its production.

Solution to Problem

In order to accomplish the present invention, the slider-equipped window glass of the present invention is a slider-equipped window glass including a window glass mounted on a side door of a vehicle so as to be vertically movable up and down and having two sides, and a slider attached to a vehicle inner surface of at least one of said two sides of the window glass, along the up-and-down movement direction, and being movable up and down along an up-and-down movement guide member fixed to said side door, wherein said slider is an integrally molded product including an inner layer portion and an outer layer portion, said inner layer portion is bonded to said vehicle inner surface of the widow glass, said outer layer portion is located at the vehicle inner surface side of the inner layer portion and made of a material harder than said inner layer portion, and said outer layer portion has an engaging portion to engage with said up-and-down movement guide member.

In order to accomplish the object of the present invention, the process for producing a slider-equipped window glass of the present invention is a process for producing a slider-equipped window glass including a window glass mounted on a side door of a vehicle so as to be vertically movable up and down and having two sides, and a slider attached to a vehicle inner surface of at least one of said two sides of the window glass, along the up-and-down movement direction, and being movable up and down along an up-and-down movement guide member fixed to said side door, said process including a first molding step of forming an inner layer portion on said vehicle inner surface of said window glass, and a second molding step of forming an outer layer portion harder than said inner layer portion, on the vehicle inner surface side of said inner layer portion, integrally with said inner layer portion, wherein the second molding step includes a step of molding an engaging portion to engage with said up-and-down movement guide member, together with said outer layer portion.

Advantageous Effects of Invention

According to the present invention, it is possible to increase the productivity and quality.

BRIEF DESCRIPTION OF DRAWINGS

FIG. 1 is an appearance diagram of a relevant part of a vehicle provided with the slider-equipped window glass according to this embodiment.

FIG. 3 is an enlarged cross sectional view of a relevant part of the slider-equipped window glass shown in FIG. 2.

DESCRIPTION OF EMBODIMENTS

Figure 2:
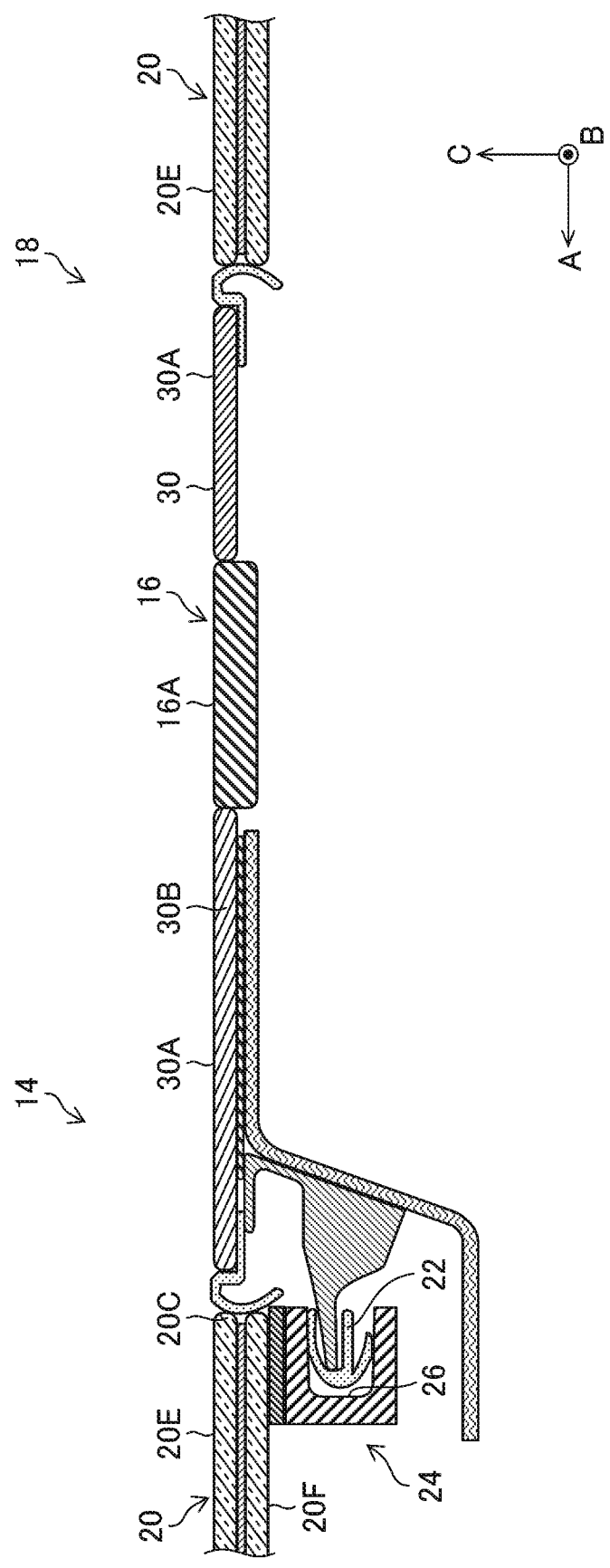
FIG. 2 is a cross sectional view of a relevant part of the slider-equipped window glass shown in FIG. 1.

Hereinafter, with reference to the accompanying drawings, preferred embodiments of the slider-equipped window glass and the process for its production according to the present invention will be described. In each FIG., arrow A indicates the front side of the vehicle, arrow B indicates the upper side of the vehicle, and arrow C indicates the outside in the width direction of the vehicle.

In FIG. 1, a front side door 14 of a vehicle 12 is shown in which the slider-equipped window glass 10 according to this embodiment is mounted to be vertically movable up and down. On the rear side of this front side door 14, a rear side door 18 is disposed via a pillar 16. Also in this rear side door 18, the slider-equipped window glass 10 (not shown) according to this embodiment is mounted to be movable up and down.

In this embodiment, description will be made with reference to a laminated glass as a window glass 20 to constitute a slider-equipped window glass 10. This window glass 20 is constructed to have a roughly trapezoid shape having a circular arc upper edge 20A, a roughly horizontal lower edge 20B, a roughly vertical rear edge 20C and a front edge 20D. The rear edge 20C and the front edge 20D correspond to the two sides of the window glass of the present invention.

The window glass 20 attached to each of the front side door 14 and the rear side door 18 is disposed so that when the engaging portion 26 of the slider 24 is engaged with the up-and-down movement guide member 22 as shown in the cross sectional view of FIG. 2, its vehicle outer surface 20E outside in the vehicle width direction would be flush with the vehicle outer surface 30A of a sash and with the vehicle outer surface 16A of a pillar 16 as described later. The vehicle outer surface 30A of the sash 30 and the vehicle outer surface 16A of the pillar 16 correspond to the vehicle outer surface of the vehicle outside in the vehicle width direction in the present invention. Thus, according to the slider-equipped window glass 10 of this embodiment, it is possible to accomplish a flush surfaced construction. Further, the up-and-down movement guide member 22 and the slider 24 will also be described later.

Returning to FIG. 1, the front side door 14 (likewise the rear side door 18) is provided with, in addition to the slider-equipped window glass 10, a door panel 28 and the above-mentioned sash 30 being the window frame. The door panel 28 constitutes a lower portion of the front side door 14. Inside of this door panel 28, a lifting and lowering device to move the slider-equipped window glass 10 up and down, is provided.

The sash 30 is provided at an upper portion of the door panel 28, and a window opening 32 is defined by the sash 30 and the door panel 28. The slider-equipped window glass 10 is moved up and down in the lifting and lowering direction (the up-and-down direction of the vehicle) along the rear vertical frame 30B of the sash 30. Thus, the window opening 32 will be closed and opened by the slider-equipped window glass 10.

The above-mentioned lifting and lowering device is provided with a motor (not shown) and a power transmission member (not shown) such as a link member or wire to transmit the power of the motor to the slider-equipped window glass 10. This power transmission member is to be connected to each of a pair of holders 34, 34 attached to the lower edge 20B of the window glass 20.

The above-mentioned FIG. 2 is a cross sectional view of the relevant part of the slider-equipped window glass 10 in a state where the window opening 32 (see FIG. 1) is closed. As shown in FIG. 2, the slider 24 is attached to the vehicle inner surface 20F of the rear edge 20C of the window glass 20. This slider 24 is attached along the up-and-down movement direction as shown in FIG. 1. Further, a slider 24 is attached also to the vehicle inner surface 20F of the front edge 20D of the window glass 20, as the case requires. Thus, in this embodiment, a slider-equipped window glass 10 having sliders 24 attached to the two sides of a window glass 20, is shown.

As shown in FIG. 3, the slider 24 is an integrally molded product including an inner layer portion 36 and an outer layer portion 38. The inner layer portion 36 is bonded to the vehicle inner surface 20F of the window glass 20, and the outer layer portion 38 is located at the vehicle inner side of the inner layer portion 36 and made of a material harder than the inner layer portion 36. Further, in the outer layer portion 38, a concave engaging portion 26 to engage with the up-and-down movement guide member 22, is formed.

Inside of the engaging portion 26 of the outer layer portion 38, the convex up-and-down movement guide member 22 shown in FIGS. 2 and 3 is inserted. Thus, the engaging portion 26 is engaged with the up-and-down movement guide member 22.

As shown in FIG. 2, the up-and-down movement guide member 22 is attached along the rear vertical frame 30B of the sash 30. Further, as shown in FIG. 1, the up-and-down movement guide member 22 is attached also to the front vertical frame 30C of the sash 30.

Returning to FIG. 3, the material for the inner layer portion 36 is a thermoplastic elastomer with a low hardness as compared with an engineering plastic such as POM (polyacetal resin) and is a thermoplastic elastomer such as PP (polypropylene resin) or PVC (polyvinyl chloride). As exemplification, the hardness of each of the above materials is such that the Rockwell hardness (R scale) of POM is 120, the Rockwell hardness (A scale) of a thermoplastic elastomer containing PP as the base material (main material) is from 50 to 95, and the Shore A hardness of PVC is from 60 to 95. Further, in the case of forming the inner layer portion 36, it is preferred to form the inner layer portion 36 after applying a primer to the vehicle inner surface 20F of the rear edge 20C of the window glass 20. It is thereby possible to increase the adhesion between the window glass 20 and the inner layer portion 36.

On the other hand, the material for the outer layer portion 38 is a material having a higher hardness and strength than the inner layer portion 36, and an engineering plastic may be selected for use, but it is preferred to select the following resin.

That is, for the slider 24 of this embodiment, the inner layer portion 36 and the outer layer portion 38 are formed by two-color molding in order to increase the quality and productivity of the slider-equipped window glass 10. That is, the slider 24 is a two-color molded product formed by two-color molding which includes forming an inner layer portion 36, followed by forming an outer layer portion 38 on the vehicle inner surface side of the inner layer portion 36.

Therefore, as the material for the outer layer portion 38, in consideration of the integral moldability (adhesion) with the inner layer portion 36, it is preferred to select a thermoplastic elastomer containing fibers such as glass fibers or carbon fibers in the same PP or PVC as the material for the inner layer portion 36.

The slider-equipped window glass 10 of this embodiment is an integrally molded product of the window glass 20, the inner layer portion 36 and the outer layer portion 38 of the slider 24 at the vehicle inner surface 20F of the rear edge 20C and the front edge 20D of a window glass 20. Therefore, the slider-equipped window glass 10 can be formed without using the double sided adhesive tape or the adhesive. Since no adhesive is used, aging time for curing the adhesive is unnecessary, and there is no fear that the slider 24 peels from the window glass 20 due to deterioration of the adhesive or the like. Furthermore, since the slider-equipped window glass 10 can be formed without using the double sided adhesive tape or the adhesive, it is possible to be molded integrally with the slider 24 to the window glass 20 with a high precision (e.g. in a few hundred micron order).

Next, the process for producing a slider-equipped window glass 10 of this embodiment will be described with reference to a flow chart shown in FIG. 4. The production process of this embodiment is a production process for attaching a slider 24 by two-color molding to the vehicle inner surface 20F of the rear edge 20C of a window glass 20. Further, since the production process for attaching a slider 24 to the vehicle inner surface 20F of the front edge 20D of the window glass 20, is the same as the following production process, its description will be omitted.

Figure 4:
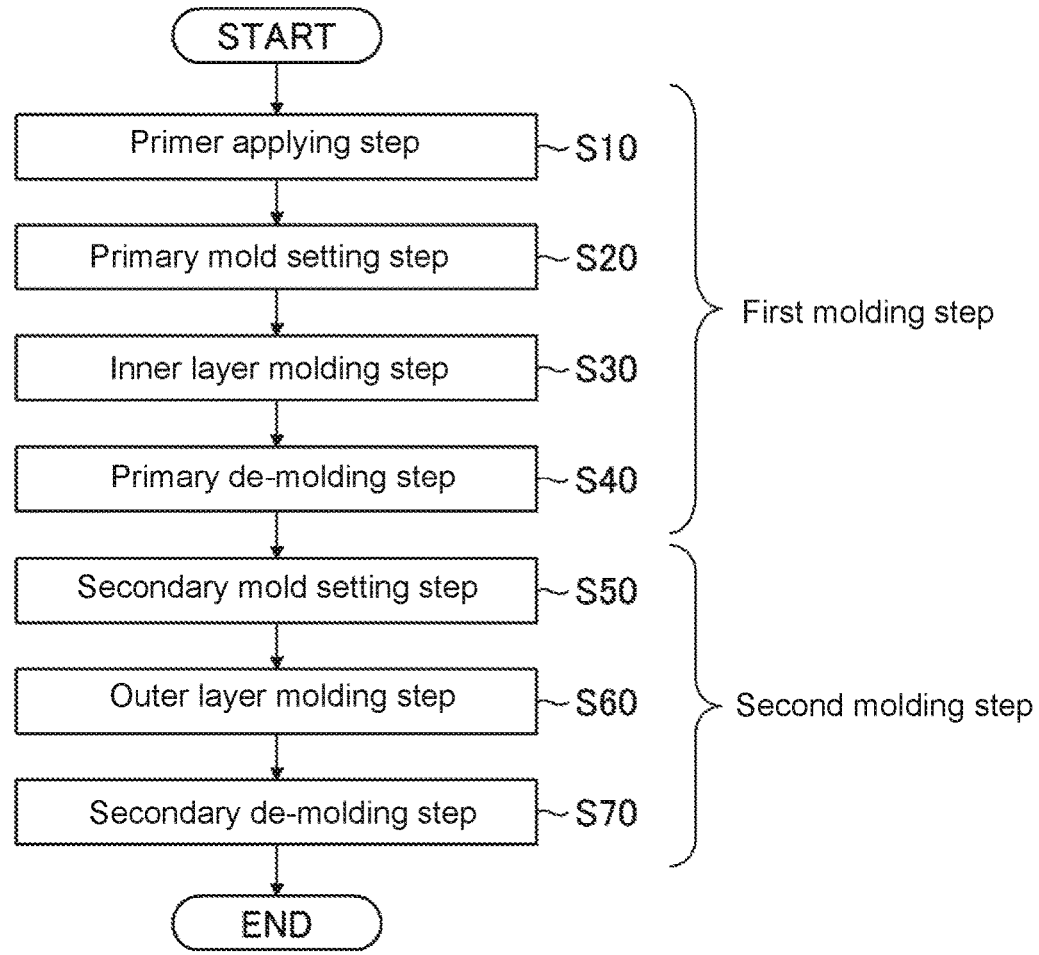
FIG. 4 is a flow chart showing the process for producing the slider-equipped window glass in this embodiment.

As shown in FIG. 4, the production process of this embodiment includes a first molding step and a second molding step as largely divided.

The first molding step includes, in sequential order, a primer applying step (S10), a primary mold setting step (S20) of attaching a primary mold for an inner layer portion to a window glass 20, an inner layer molding step (S30) of injecting molten PP (may be PVC) into the primary mold, and a primary de-molding step (S40) of dismounting the primary mold from the window glass 20.

The primer applying step (S10) is a step of applying a primer to the vehicle inner surface 20F of the rear edge 20C of the window glass 20.

Figure 5:
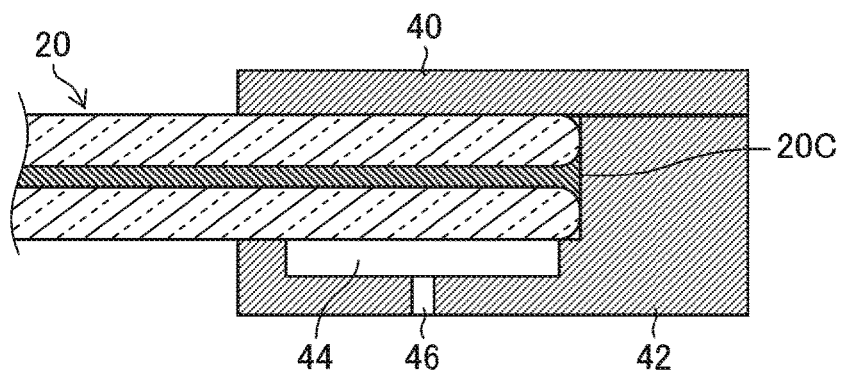
FIG. 5 is an illustrative view of the primary mold setting step.

FIG. 5 is an illustrative view of the primary mold setting step (S20). In FIG. 5, a cross sectional view is shown in which a pair of molds 40, 42 constituting the primary mold are set at the position of the window glass 20 where a slider 24 is to be attached. In FIG. 5, a cavity space 44 to form an inner layer portion 36 is formed by the inner wall surfaces of the pair of molds 40, 42, and an injection inlet 46 to inject PP into the cavity space 44 is formed in the mold 42. Here, in FIG. 5, an example is shown wherein the primary mold is constructed by a pair of molds 40, 42, but the construction example of the primary mold is not limited to one shown in FIG. 5.

Figure 6:
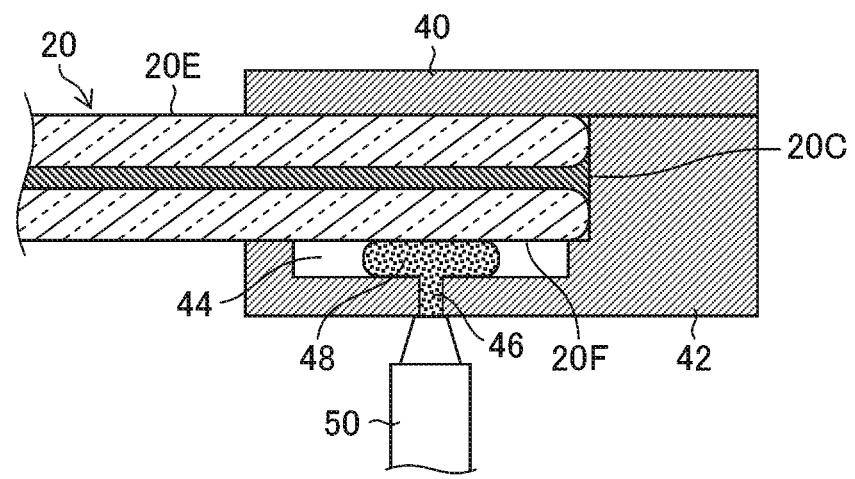
FIG. 6 is an illustrative view of the inner layer molding step.

Next, in the inner layer molding step (S30), as shown in the illustrative view of FIG. 6, molten PP48 is injected into the cavity space 44 from the injection inlet 46 by an injection cylinder 50. An inner layer portion 36 will thereby be formed on the vehicle inner surface 20F of the rear edge 20C of the window glass 20. Thereafter, in the primary de-molding step (S40), the molds 40, 42 are dismounted from the window glass 20.

On the other hand, the second molding step includes, in sequential order, a secondary mold setting step (S50) of attaching a secondary mold for the outer layer portion to the window glass 20, an outer layer molding step (S60) of injecting molten PP (may be PVC) containing e.g. 30% of glass fibers into the secondary mold, and a secondary de-molding step (S70) of dismounting the secondary mold from the window glass 20.

Figure 7:
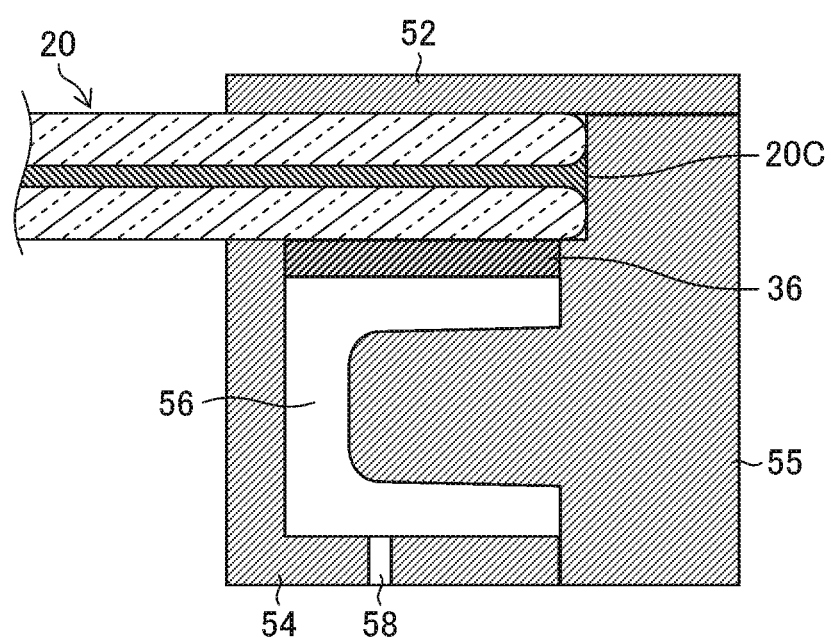
FIG. 7 is an illustrative view of the secondary mold setting step.

FIG. 7 is an illustrative view of the secondary mold setting step (S50). In FIG. 7, a cross sectional view is shown wherein molds 52, 54, 55 to constitute the secondary mold are set at the position of the window glass 20 where a slider 24 is to be attached. In FIG. 7, a cavity space 56 to form the outer layer portion 38 is formed by the inner wall surfaces of the molds 54, 55, and an injection inlet 58 to inject PP containing 30% of glass fibers into the cavity space 56 is formed in the mold 54. Here, in FIG. 7, an example is shown wherein the secondary mold is constructed by molds 52, 54, 55, but the construction example of the secondary mold is not limited to one shown in FIG. 7.

Figure 8:
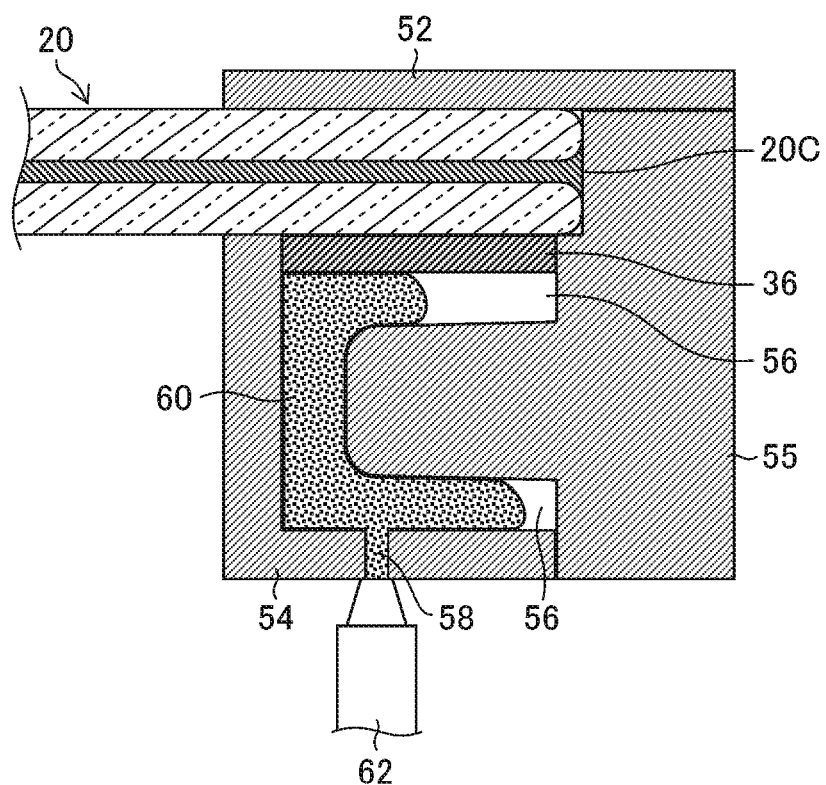
FIG. 8 is an illustrative view of the outer layer molding step.

Next, in the outer layer molding step (S60), as shown in the illustrative view of FIG. 8, molten PP60 containing 30% of glass fibers, is injected into the cavity space 56 from the injection inlet 58 by an injection cylinder 62. An outer layer portion 38 is thereby integrally formed outside of the inner layer portion 36. Thereafter, in the secondary de-molding step (S70), the molds 52, 54, 55 are dismounted from the window glass 20. Thus, the slider 24 of the two-color molded product including the inner layer portion 36 and the outer layer portion 38 can be formed integrally with the rear edge 20C of the window glass 20.

Here, in the outer layer molding step (S60) in this embodiment, PP of the same base material (main material) as the material for the inner layer portion 36 is used, whereby molten PP60 containing 30% of glass fibers will be well heat-fused to the inner layer portion 36 made of PP. It is thus possible to construct a slider 24 having a high dimensional precision and a stabilized shape. The above-mentioned content (30%) of glass fibers is one to be set depending upon the hardness required for the outer layer portion 38, and as exemplification, it is set to be from 30% to 40%. Further, instead of glass fibers, carbon fibers may be incorporated to PP.

Accordingly, by the production process of this embodiment, the window glass 20, the inner layer portion 36 and the outer layer portion 38 of the slider 24 are integrally molded by injection molding at the vehicle inner surface 20F of the rear edge 20C and the front edge 20D of a window glass 20. Further, the production process of this embodiment, the slider 24 is formed by the two-color molding, whereby steps S10 to S70 can be carried out in a few minutes. Thus, the slider 24 is possible to be molded integrally with the window glass 20 in a short time. Therefore, according to the production process of this embodiment, as compared with Patent Documents 1 and 2, it is possible to increase the productivity of the slider-equipped window glass.

Further, according to the production process of this embodiment, since it is a process by two-color molding, it is possible to attach a slider 24 to a window glass 20 with a high precision (e.g. at a few hundred micron order). Furthermore, according to the production process of this embodiment, since there is no step to cause a positional displacement of the slider relative to the window glass as in Patent Documents 1 and 2, it is also possible to increase the quality of the slider-equipped window glass 10.

As described above, according to the slider-equipped window glass 10 and the process for its production of this embodiment, it is possible to increase the productivity and quality of the slider-equipped window glass 10.

Further, the slider 24 in this embodiment is composed of a soft inner layer portion 36 and a hard outer layer portion 38, whereby even if a difference in the expansion degree is resulted between the window glass 20 and the outer layer portion 38 due to a difference in the linear expansion coefficient, such a difference may be absorbed as the inner layer portion 36 undergoes elastic deformation. Thus, a problem to be caused by a difference in the linear expansion coefficient between the window glass 20 and the outer layer portion 38, i.e. a problem of peeling of the slider 24 from the window glass 20, will not result. Accordingly, it is possible to increase the quality of the slider-equipped window glass 10.

Further, in the production process of this embodiment, by carrying out the first molding step and the second molding step as follows, it is possible to further shorten the production time of the slider-equipped window glass 10.

That is, in the first molding step, in a preliminary step of the inner layer molding step (S30), molds 40, 42 are preliminarily heated to the temperature of molten PP 48, and thereafter, the inner layer molding step (S30) is carried out. And, immediately after completion of the inner layer molding step (S30), the molds 40, 42 are quenched by a cooling medium. Thus, it is possible to mold the inner layer portion 36 in a short time. Likewise in the second molding step, in a preliminary step of the outer layer molding step (S60), molds 52, 54 are preliminarily heated to the temperature of molten PP60 containing 30% of glass fibers, and thereafter, the outer layer molding step (S60) is carried out. And, immediately after completion of the outer layer molding step (S60), the molds 52, 54 are quenched by a cooling medium. Thus, it is possible to form the outer layer portion 38 in a short time. By heating and cooling the primary mold and the secondary mold at the predetermined timings as described above, it is possible to shorten the molding time of the slider 24. Thus, it is possible to further shorten the production time of the slider-equipped window glass 10.

Here, in this embodiment, an example is shown wherein sliders 24, 24 are attached to vehicle inner surfaces 20F in the vicinity of two sides (rear edge 20C and front edge 20D) of a window glass 20, but a slider 24 may be attached to an vehicle inner surface 20F in the vicinity of at least one side of a window glass 20.

Further, in this embodiment, as the window glass 20, a laminated glass was exemplified, but the window glass is not limited thereto and may, for example, be a single plate glass.

Further, as the window glass 20, in addition to a non-tempered glass, a tempered glass may be used. The tempered glass may be an air-cooled tempered glass or a chemically tempered glass. In a case where a tempered glass is used for a single plate glass, in order to prevent scattering of glass pieces when broken, a scattering preventive film may be bonded on the surface of the single plate glass. On the other hand, in a case where a tempered glass is used for a laminated glass, the function of the scattering preventive film may be born by a known interlayer, so that the scattering preventive film will not be required. Such an interlayer of the laminated glass may, for example, be a known layer made of e.g. PVB (polyvinyl butyral) or EVA (ethylene vinyl acetate).

Figure 9:
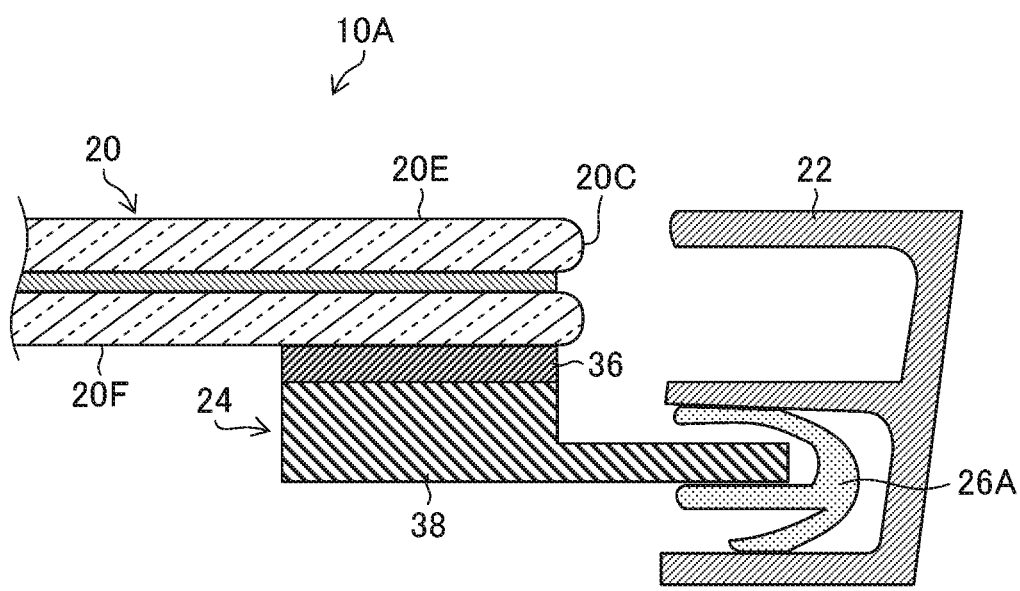
FIG. 9 is a cross sectional view of a relevant part of the slider-equipped window glass in another embodiment.

Further, in this embodiment, as shown in FIG. 3, a concave engaging portion 26 is formed on the slider 24 side, and the up-and-down movement guide member 22 is formed to be convex, but the engagement mode is not limited thereto. For example, as shown in the cross sectional view of the slider-equipped window glass 10A in another embodiment shown in FIG. 9, a convex engaging portion 26A may be formed on the slider 24 side, and the up-and-down movement guide member 22 side may be formed to be concave.

The entire disclosure of Japanese Patent Application No. 2017-236134 filed on Dec. 8, 2017 including specification, claims, drawings and summary is incorporated herein by reference in its entirety.

REFERENCE SYMBOLS

10: Slider-equipped window glass, 10A: slider-equipped window glass, 12: vehicle, 14: front side door, 16: pillar, 18: rear side door, 20: window glass, 22: up-and-down movement guide member, 24: slider, 26: engaging portion, 26A: engaging portion, 28: door panel, 30: sash, 32: window opening, 34: holder, 36: inner layer portion, 38: outer layer portion, 40: mold, 42: mold, 44: cavity space, 46: injection inlet, 48: molten PP, 50: injection cylinder, 52: mold, 54: mold, 55: mold, 56: cavity space, 58: injection inlet, 60: PP containing 30% of glass fibers, 62: injection cylinder

What is claimed is:

1. A slider-equipped window glass comprising:
    a window glass mounted on a side door of a vehicle so as to be vertically movable in an up-and-down direction and having two sides and a glass inner surface; and
    a slider attached to the glass inner surface, positioned along at least one of said two sides of the window glass, extending along the up-and-down direction, and being movable up and down along an up-and-down movement guide member fixed to said side door, wherein
    said slider is an integrally molded product that is formed as a single piece and comprises an inner layer portion and an outer layer portion and said slider is a two-color molded product comprising said inner layer portion and outer layer portion,
    said inner layer portion is bonded to said glass inner surface of the window glass, with a primer is applied between the inner layer portion and the window glass, and
    said outer layer portion is located at a vehicle inner surface side of the inner layer portion and made of a material harder than said inner layer portion,
    said outer layer portion has an engaging portion to engage with said up-and-down movement guide member,
    said inner layer portion of the slider is made of a thermoplastic elastomer, and said outer layer portion is made of a thermoplastic elastomer containing fibers, and
    the slider-equipped window glass is an integrally molded product of the window glass and the slider.

2. The slider-equipped window glass according to claim 1, wherein said slider is disposed at each of said two sides of the window glass.

3. The slider-equipped window glass according to claim 1, wherein said engaging portion is made to be a concave portion or a convex portion.

4. The slider-equipped window glass according to claim 1, wherein said window glass is a laminated glass or a single-plate glass.

5. The slider-equipped window glass according to claim 1, wherein the window glass comprises a glass outer surface that is outside of the glass inner surface in a vehicle width direction,
    wherein, when said engaging portion of the slider is engaged with said up-and-down movement guide member, said slider-equipped window glass is disposed so that the glass outer surface is flush with a vehicle outer surface of the vehicle in the vehicle width direction.

6. The slider-equipped window glass according to claim 1, wherein the window glass comprises a glass outer surface that is outside of the glass inner surface in a vehicle width direction,
   wherein said slider-equipped window glass is provided on each of a front side door and a rear side door of the vehicle that are located adjacent to each other in a front and rear direction of the vehicle, and
   wherein said slider-equipped window glass, which is provided on each of the front side door and the rear side door, is disposed so that the glass outer surface is flush with a vehicle outer surface of the vehicle in the vehicle width direction.

7. The slider-equipped window glass according to claim 1, wherein the thermoplastic elastomer containing fibers of the outer layer portion of the slider contains 30 to 40% of glass fibers.

* * * * *